United States Patent
Chen et al.

(10) Patent No.: US 10,340,999 B2
(45) Date of Patent: Jul. 2, 2019

(54) WIRELESS COMMUNICATION DEVICE AND WIRELESS COMMUNICATION METHOD

(71) Applicant: Sony Corporation, Tokyo (JP)

(72) Inventors: Jinhui Chen, Beijing (CN); Xin Guo, Beijing (CN); Yuxin Wei, Beijing (CN); Chen Sun, Beijing (CN)

(73) Assignee: Sony Corporation, Tokyo (JP)

( * ) Notice: Subject to any disclaimer, the term of this patent is extended or adjusted under 35 U.S.C. 154(b) by 22 days.

(21) Appl. No.: 15/545,127

(22) PCT Filed: Jan. 27, 2016

(86) PCT No.: PCT/CN2016/072278
§ 371 (c)(1),
(2) Date: Jul. 20, 2017

(87) PCT Pub. No.: WO2016/119695
PCT Pub. Date: Aug. 4, 2016

(65) Prior Publication Data
US 2018/0013478 A1    Jan. 11, 2018

(30) Foreign Application Priority Data
Jan. 28, 2015    (CN) .......................... 2015 1 0043600

(51) Int. Cl.
*H04W 24/08*    (2009.01)
*H04B 7/06*    (2006.01)
(Continued)

(52) U.S. Cl.
CPC ......... *H04B 7/0626* (2013.01); *H04B 7/0456* (2013.01); *H04L 1/00* (2013.01);
(Continued)

(58) Field of Classification Search
CPC .... H04B 7/0626; H04B 7/063; H04B 7/0452; H04B 7/0632; H04L 1/0026;
(Continued)

(56) References Cited

U.S. PATENT DOCUMENTS 9,918,240 B2 *    3/2018    Lee ...................... H04B 7/0469
2011/0134747 A1 *    6/2011    Kwon .................. H04L 1/0028
                                                                              370/208

(Continued)

FOREIGN PATENT DOCUMENTS

CN    101877608 A    11/2010
CN    103716117 A    4/2014

OTHER PUBLICATIONS

International Search Report dated Apr. 25, 2016 in PCT/CN2016/072278 filed Jan. 27, 2016.

*Primary Examiner* — Jay P Patel
(74) *Attorney, Agent, or Firm* — Xsensus, LLP

(57) ABSTRACT

A wireless communication device and a wireless communication method. The wireless communication device includes one or more processors. The processor is configured to estimate an equivalent channel from a base station to user equipment based on a user equipment specific reference signal from the base station, and generate, according to the estimated equivalent channel, a channel state indication used to be fed back to the base station.

17 Claims, 8 Drawing Sheets

(51) Int. Cl.
*H04L 1/00* (2006.01)
*H04L 5/00* (2006.01)
*H04L 25/02* (2006.01)
*H04B 7/0456* (2017.01)
*H04B 7/0452* (2017.01)
*H04W 72/12* (2009.01)

(52) U.S. Cl.
CPC .......... H04L 1/0026 (2013.01); H04L 5/0051 (2013.01); H04L 25/0224 (2013.01); *H04B 7/0452* (2013.01); *H04B 7/063* (2013.01); *H04B 7/0632* (2013.01); *H04L 1/0003* (2013.01); *H04L 1/0009* (2013.01); *H04L 2001/0093* (2013.01); *H04W 72/1231* (2013.01)

(58) Field of Classification Search
CPC ..... H04L 5/0051; H04L 25/0224; H04L 1/00; H04L 2001/0093; H04L 1/0009; H04L 1/0003; H04W 72/1231
See application file for complete search history.

(56) References Cited

U.S. PATENT DOCUMENTS

| | | | | |
|---|---|---|---|---|
| 2011/0317748 A1* | 12/2011 | Li | .................. | H04B 7/0417 375/219 |
| 2012/0039298 A1* | 2/2012 | Lee | .................. | H04L 1/0079 370/330 |
| 2012/0099470 A1* | 4/2012 | Li | .................. | H04B 7/024 370/252 |
| 2012/0176982 A1* | 7/2012 | Zirwas | ............... | H04B 7/024 370/329 |
| 2013/0208604 A1* | 8/2013 | Lee | .................. | H04L 25/0226 370/252 |
| 2014/0064135 A1* | 3/2014 | Chen | ................ | H04L 1/0046 370/253 |
| 2014/0153427 A1* | 6/2014 | Seo | .................. | H04L 1/20 370/252 |
| 2014/0204770 A1* | 7/2014 | Mondal | ............ | H04W 24/00 370/252 |
| 2014/0301238 A1 | 10/2014 | Chun et al. | | |
| 2015/0030006 A1* | 1/2015 | Fujio | ............... | H04B 7/0456 370/336 |
| 2015/0055723 A1* | 2/2015 | Kim | .................. | H04B 7/024 375/267 |
| 2015/0249981 A1 | 9/2015 | Wu et al. | | |
| 2015/0304076 A1* | 10/2015 | Lee | .................. | H04L 5/005 370/329 |
| 2015/0358060 A1* | 12/2015 | Park | ................ | H04B 7/0473 370/329 |
| 2016/0028519 A1* | 1/2016 | Wei | .................. | H04B 7/0456 375/267 |
| 2016/0043843 A1* | 2/2016 | Liu | .................. | H04L 5/0048 370/329 |
| 2016/0050003 A1* | 2/2016 | Ko | .................. | H04B 7/0469 370/329 |
| 2016/0065388 A1* | 3/2016 | Kakishima | ..... | H04B 17/391 370/329 |
| 2016/0072565 A1* | 3/2016 | Yu | .................. | H04L 1/0026 375/267 |
| 2016/0072572 A1* | 3/2016 | Kang | .............. | H04B 7/0417 370/329 |
| 2016/0105265 A1* | 4/2016 | Wang | .............. | H04L 5/0048 370/252 |
| 2016/0149680 A1* | 5/2016 | Kang | .............. | H04B 7/0417 370/329 |
| 2016/0156401 A1* | 6/2016 | Onggosanusi | ... | H04B 7/0478 370/329 |
| 2016/0192383 A1* | 6/2016 | Hwang | ........... | H04L 1/1812 370/330 |
| 2016/0269089 A1* | 9/2016 | Liu | .................. | H04B 7/0626 |
| 2016/0344525 A1* | 11/2016 | Kang | .............. | H04B 7/0469 |
| 2018/0242308 A1* | 8/2018 | Ko | .................. | H04L 1/1607 |

* cited by examiner

WIRELESS COMMUNICATION DEVICE AND WIRELESS COMMUNICATION METHOD

FIELD

The present disclosure relates to the field of wireless communication, and in particular to wireless communication device for user equipment side, wireless communication device for base station side, wireless communication method performed by user equipment and wireless communication method performed by base station.

BACKGROUND

In an existing wireless communication system, a user equipment estimates a channel according to a cell reference signal and a channel state information reference signal which are not precoded, and a user equipment specific reference signal (UE-specific RS) transmitted by a base station, e.g., a downlink modulation reference signal (DMRS), is only for downlink demodulation.

SUMMARY

In a frequency division system, errors generated in channel state estimation and feedback may cause a base station to be unable to set an ideal communication resource scheduling and modulation coding scheme, thereby may result in great deviation between actual transmission and an estimated result of the base station.

A brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. The object of the summary is only to give some concepts of the present disclosure in a simplified form, as a preamble of the detailed description later.

According to an aspect of the present disclosure, a wireless communication device for user equipment side is provided. The wireless communication device includes at least one processor. The processor is configured to estimate, based on a user equipment specific reference signal from a base station, an equivalent channel from the base station to the user equipment; and generate, based on the estimated equivalent channel, a channel state indication to be fed back to the base station.

According to another aspect of the present disclosure, a wireless communication method performed by a user equipment is provided. The method includes a step of estimating, based on a user equipment specific reference signal from a base station, an equivalent channel from the base station to the user equipment. The method further includes a step of generating, based on the estimated equivalent channel, a channel state indication to be fed back to the base station.

According to another aspect of the present disclosure, a wireless communication device for base station side is provided. The wireless communication device includes a transceiving apparatus and at least one processor. The transceiving apparatus is configured to transmit a precoded user equipment specific reference signal, and receive a channel state indication fed back by the user equipment based on the user equipment specific reference signal. The processor is configured to adjust at least one of a communication resource scheduling scheme, a multi-antenna precoding mode and a modulation coding scheme of the base station based on the channel state indication.

According to another aspect of the present disclosure, a wireless communication method performed by a base station is provided. The method includes a step of transmitting a pre-coded user equipment specific reference signal. The method further includes a step of receiving a channel state indication fed back by the user equipment based on the user equipment specific reference signal. In addition, the method further includes a step of adjusting at least one of a communication resource scheduling scheme, a multi-antenna precoding mode and a modulation coding scheme of the base station based on the channel state indication.

With the wireless communication device and the wireless communication method according to embodiments of the present disclosure, a channel state indication is generated using an equivalent channel estimated based on a user equipment specific reference signal. A more accurate estimation of channel quality can be provided as compared with an existing manner in which the channel quality is fed back based on a cell-specific reference signal.

BRIEF DESCRIPTION OF THE DRAWINGS

The present disclosure can be better understood with reference to the description given in conjunction with the drawings in the following. The same or similar elements are indicated by the same or similar reference numerals throughout all the drawings. The drawings are included in the description together with the following detailed illustration and form a part of the description, and are used to further illustrate preferred embodiments of the present disclosure and explain principles and advantages of the present disclosure by examples. In the drawings.

DETAILED DESCRIPTION OF THE EMBODIMENTS

Figure 1:
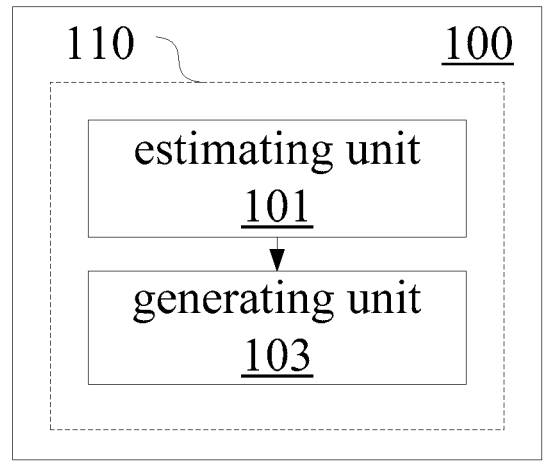
FIG. 1 is a block diagram of a configuration example of a wireless communication device for user equipment side according to an embodiment of the present disclosure.

Hereinafter embodiments of the present disclosure are described with reference to drawings. In the present disclosure, elements and features described in one drawing or one embodiment may be combined with elements and features described in one or more other drawings or embodiments. It should be noted that, for clearness, indication and description of components and processing which are not related to the present disclosure and known for those skilled in the art are omitted in the drawings and description.

Subsequently, a wireless communication device 100 according to an embodiment of the present disclosure is described with reference to FIG. 1. The wireless communication device 100 is for user equipment side. As will be described later, the wireless communication device according to the embodiment of the present disclosure may be the user equipment itself. However, the present disclosure is not limited thereto, and the wireless communication device according to the embodiment of the present disclosure may be a part of the user equipment such as a communication control portion or an independent device connected to the user equipment, for example.

As shown in FIG. 1, the wireless communication device 100 according to the embodiment includes a processor 110. It should be noted that, in order to facilitate illustration and description, an estimating unit 101 and a generating unit 103 of the processor 110 are shown as functional modules. It should be understood that, the estimating unit 101 and the generating unit 103 indicate functions which may be implemented by the processor 110, and are not necessarily actual components of the processor 110. In addition, the processor 110 is shown by one dotted line block in FIG. 1, but the communication device 100 may include multiple processors which may operate in cooperation to implement functions of the estimating unit 101 and the generating unit 103.

The estimating unit 101 is configured to estimate an equivalent channel from a base station to the user equipment based on a user equipment specific reference signal from the base station. For example, the user equipment specific reference signal includes a Demodulation Reference Signal (DMRS) for the user equipment in a 3GPP LTE-A standard.

In addition, the user equipment specific reference signal may be precoded by the base station, and the equivalent channel is a product of a physical channel from the base station to the user equipment and a corresponding precoding matrix. For example, y=HPx indicates a precoded signal received by the user equipment, where x indicates content transmitted by the base station, H indicate a physical channel matrix, P indicates a precoding matrix, and a product HP indicates the equivalent channel matrix. It should be noted that, the DMRS specific to the user equipment is only exemplary. Those skilled in the art should understand that with an evolution of communication protocols, other reference signals precoded together with data which appear in the future may also be used to estimate the equivalent channel, which is not limited in the present disclosure.

The generating unit 103 is configured to generate a channel state indication to be fed back to the base station based on the estimated equivalent channel.

As described above, the channel state indication (also referred to as channel state information in some examples) may include the equivalent channel quality indication or a downlink channel quality indication generated based on the equivalent channel quality in combination with other channel state information. Accordingly, in a case that the channel state indication includes the equivalent channel quality indication, the generating unit 103 may generate an equivalent channel quality indication by performing quantization processing on the estimated equivalent channel. More specifically, the equivalent channel state indication may include an equivalent Channel Quality Index (CQI). In addition, the equivalent channel state indication may further include one or more of an equivalent Channel Direction Index (CDI), a Precoding Matrix Index (PMI) and a Rank Index (RI).

According to an embodiment, a channel feedback of the wireless communication device based on the user equipment specific reference signal may be a subband feedback, such as a feedback for a subband where a Physical Downlink Shared Channel PDSCH for carrying the user equipment specific reference signal is located.

Figure 2:
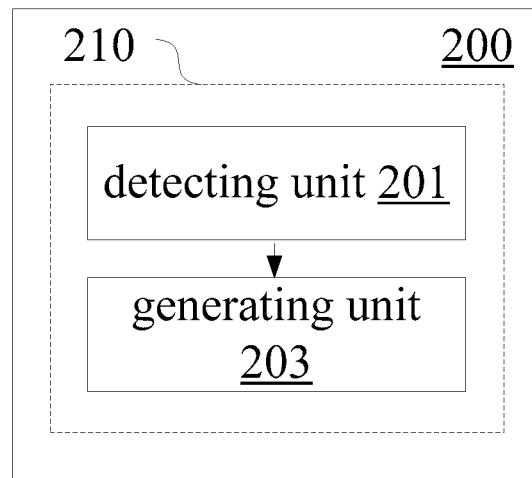
FIG. 2 is a block diagram of a configuration example of a wireless communication device for user equipment side according to another embodiment of the present disclosure.

As shown in FIG. 2, a processor 210 of a wireless communication device 200 includes a detecting unit 201 and a generating unit 203. The detecting unit 201 is configured to detect a user equipment specific reference signal on a specific transmission resource allocated to the user equipment. Accordingly, a channel state indication generated by the generating unit 203 includes subband channel state information.

In addition to generating the channel state indication based on the user equipment specific reference signal, the communication device according to the embodiment of the present disclosure may also generate channel state information to be fed back to a base station based on a cell-specific reference signal from the base station.

Still referring to FIG. 1, the estimating unit 101 may also configured to estimate a channel from the base station to the user equipment based on the cell-specific reference signal and/or a cell channel estimation reference signal from the base station. Accordingly, the generating unit 103 may generate channel station information to be fed back to the base station based on the estimated channel. The channel state information may include one or more of a Channel Quality Index (CQI), a Channel Direction Index (CDI), a Precoding Matrix Index (PMT) and a Rank Index (RI), for example. As known in the art, the cell-specific reference signal may include, for example, a Cell Reference Signal (CRS) and a Channel State Information Reference Signal (CSI-RS), etc. A channel from the base station to the user equipment may be estimated based on the cell-specific reference signal and channel state information may be generated based on the estimated channel by various existing manners.

In addition, according to an embodiment, the estimating unit 101 may be configured to generate a channel state indication to be fed back to the base station by using the equivalent channel estimated based on the user equipment specific reference signal in combination with a channel estimated based on at least one of the cell-specific reference signal and a cell channel estimation reference signal. For example, the estimating unit 101 may calculate an estimation value of a physical channel based on the CRS/CSI-RS, determine an estimation value of the physical channel by equivalent channel estimation, then average the estimation values obtained by the two manners, and select a corresponding channel state indication such as PMI or CQI based on the average value.

In the embodiment, a single channel quality indication is obtained by combining the channel estimation values obtained by two manners. In addition, there may be multiple separate channel state indications. According to an embodiment, the estimating unit 101 may be configured to generate channel state indications to be fed back to the base station respectively for the equivalent channel estimated based on the user equipment specific reference signal and a channel estimated based on at least one of the cell-specific reference signal and the cell channel estimation reference signal. In this case, the base station may consider multiple channel state indications comprehensively, and thereby determining a channel quality.

For example, the channel state information fed back based on the cell-specific reference signal may be used by the base station to determine initial settings of a communication resource scheduling scheme, a multi-antenna precoding mode and a modulation coding scheme and so on, and subsequently the base station may adjust the settings of the communication resource scheduling scheme, the multi-antenna precoding mode and the modulation coding scheme based on the channel state indication of the equivalent channel fed back by a user equipment based on the user equipment specific reference signal, which will be described in more detail in combination with embodiments.

Figure 3:
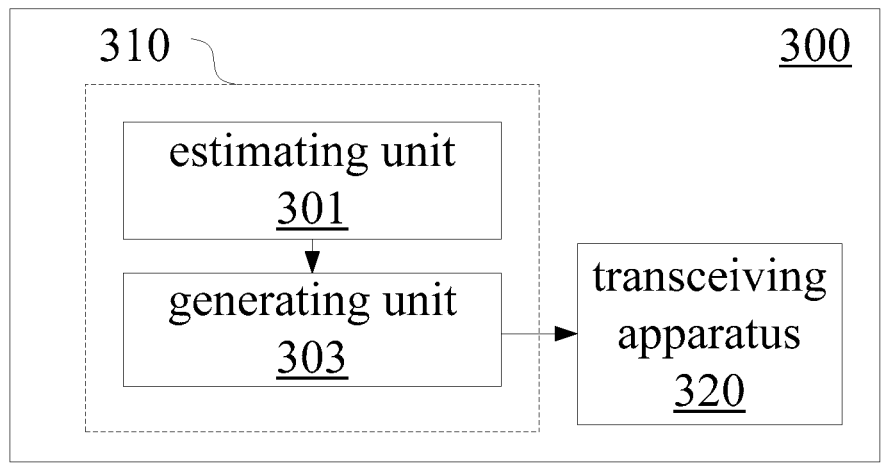
FIG. 3 is a block diagram of a configuration example of a wireless communication device for user equipment side according to yet another embodiment of the present disclosure.

As described above, the communication device for user equipment side according to the embodiment of the present disclosure may be the user equipment itself. As shown in FIG. 3, a communication device 300 according to an embodiment includes at least one processor 310 and a transceiving apparatus 320. The processor 310 may have the similar configuration as that of the processor 110 illustrated with reference to FIG. 1, i.e., including an estimating unit 301 and a generating unit 303 which are similar to the estimating unit 101 and the generating unit 103, respectively. The transceiving apparatus 320 is configured to transmit a channel state indication generated by the generating unit 303 to the base station. For example, the transceiving apparatus 320 may transmit the channel state indication via a Physical Uplink Control CHannel (PUCCH), or transmit the channel state indication via a Physical Uplink Shared CHannel (PUSCH) in a case that PUSCH resource is scheduled.

In addition, the wireless communication device according to an embodiment may be configured to trigger an estimation of the equivalent channel and generation and feedback of a corresponding channel state indication based on a specific condition. The specific condition includes, for example, a notification from the base station (such as a non-periodical channel state reporting requirement), an arrival of periodical channel state reporting timing and a change of a communication quality of the user equipment (such as quality deterioration and not reaching an expected threshold).

In a case that a channel state indication reflecting the equivalent channel is fed back in response to the notification requirement from the base station, the transceiving apparatus 320 may be configured to receive the notification from the base station, the notification indicating whether the channel state indication is to be transmitted by the user equipment. The notification may be transmitted by the base station via a Radio Resource Control (RRC) signaling, a Physical Downlink Control CHannel (PDCCH) or an enhanced Physical Downlink Control CHannel (ePDCCH), for example. In another example, the base station configures the user equipment to report the channel state of the equivalent channel periodically by a high layer signaling of the RRC, for example. The configuration information includes a periodical timing. The transceiving apparatus 320 of the user device receives the configuration information and performs measuring and reporting based on a specified period. It should be noted that, the estimation of the equivalent channel generally depends on data transmission (carried on the PDSCH) of the base station, therefore the base station may set different periods based on data transmission features (e.g., frequencies) between respective user equipments and the base station. In some examples, the base station sets feedback durations based on the data transmission features between respective user equipments and the base station. For example, feedback is performed only within the specified feedback duration.

In describing the wireless communication device according to the embodiments of the present disclosure above, some processing or methods are also disclosed. In the following, summary of the methods are provided without repeating some details discussed above.

Figure 4:
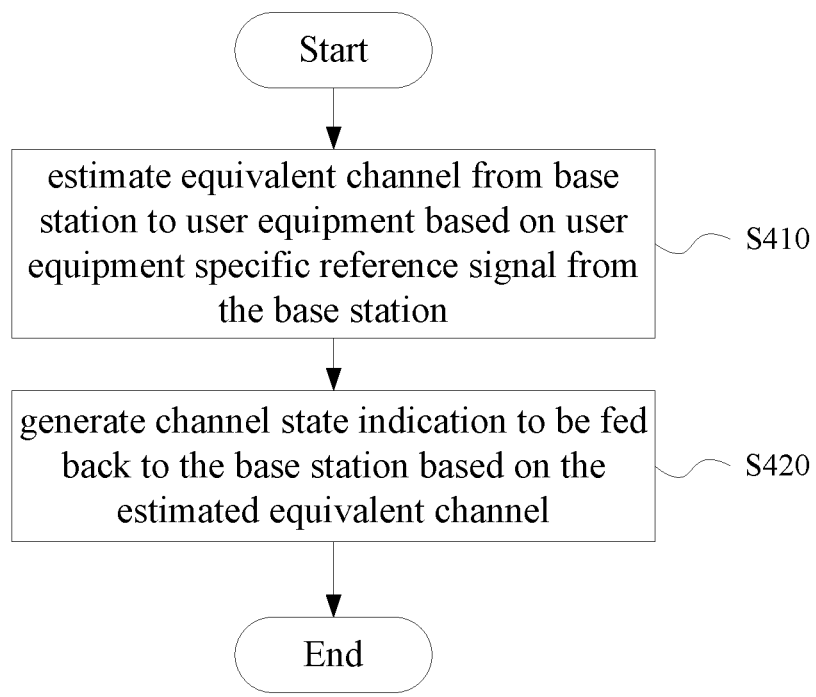
FIG. 4 is a flowchart of a process example of a wireless communication method performed by a user equipment according to an embodiment of the present disclosure.

As shown in FIG. 4, a wireless communication method performed by a user equipment according to an embodiment of the present disclosure includes: step S410, an equivalent channel from a base station to the user equipment is estimated based on a user equipment specific reference signal from the base station; and step S420, a channel state indication to be fed back to the base station is generated based on the estimated equivalent channel.

Embodiments of the present disclosure also include a wireless communication device for base station side.

Figure 5:
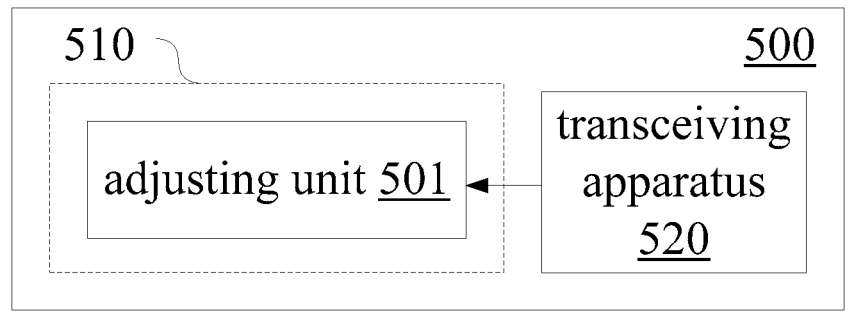
FIG. 5 is a block diagram of a configuration example of a wireless communication device for base station side according to an embodiment of the present disclosure.

As shown in FIG. 5, a wireless communication device 500 for base station side includes a transceiving apparatus 520 and at least one processor 510.

The transceiving apparatus 520 is configured to transmit a precoded user equipment specific reference signal. The user equipment specific reference signal includes a demodulation reference signal for the user equipment, for example.

The transceiving apparatus 520 is further configured to receive a channel state indication fed back by the user equipment based on the user equipment specific reference signal. As described above, the channel state indication is generated by the user equipment based on the equivalent channel from the base station to the user equipment estimated based on the user equipment specific reference signal from the base station. More specifically, the equivalent channel may be a product of a physical channel from the base station to the user equipment and a corresponding precoding matrix. The channel state indication may include an equivalent CQI, an equivalent CDI, a PMI and an RI which have been quantized. Alternatively, the channel state indication may include a channel state indication reflecting an equivalent channel generated based on the equivalent channel state in combination with a conventional channel state estimated based on CRS/CSI-RS.

The processor 510 includes an adjusting unit 501 configured to adjust at least one of a communication resource scheduling scheme, a multi-antenna precoding mode and a modulation coding scheme of the base station based on the channel state indication.

As a specific example, a cell includes one multi-antenna base station eNB and three user equipments UE0, UE1 and UE2 as transmission objects of the eNB. Take the case where UE0 is the scheduled object as an example, assuming that the eNB should schedule UE0 and UE1 in the multiple user equipments described above to perform multi-user multi-input multi-output (MU-MIMO) communication on a certain resource block based on an actual channel transmission condition, but the eNB schedules UE0 and UE2 with great actual mutual interference to perform MU-MIMO on the source based on channel feedback with a great error, for example, due to errors of channel estimation and feedback performed based on a cell-specific reference signal (for example, the base station determines channel correlation degrees between UE0 and respective user equipments as UE2<UE1<UE3 according to the channel feedback for CRS), thereby resulting in a bad downlink transmission effect of UE0 and a low CQI of the equivalent channel. According to the solution of the present disclosure, the UE0 feeds back the CQI reflecting the equivalent channel to the eNB based on the user equipment specific reference signal. The eNB may adjust the resource scheduling according to the feedback on the equivalent CQI (for example, determining that the equivalent CQI is less than a threshold). For example, the eNB tries to schedule UE1 and UE0 with a second lowest channel correlation degree according to the CRS channel feedback to perform MU-MIMO, recalculates a precoding matrix of the MU-MIMO, and confirms a scheduling effect by the equivalent channel feedback of the UE0. Therefore, according to the embodiment of the present disclosure, the quality of the equivalent channel is fed back based on the user equipment specific reference signal, thereby improving the accuracy of channel quality feedback.

In addition to transmitting the user equipment specific reference signal, the wireless communication device for base station side according to the embodiment of the present disclosure can also transmit at least one of a cell-specific reference signal and a cell channel estimation reference signal.

Figure 6:
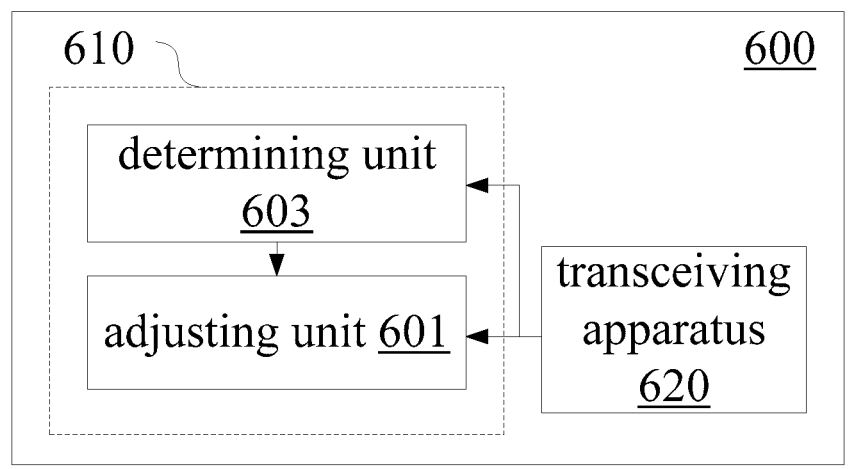
FIG. 6 is a block diagram of a configuration example of a wireless communication device for base station side according to another embodiment of the present disclosure.

As shown in FIG. 6, a wireless communication device 600 for base station side according to an embodiment includes a transceiving apparatus 620 and a processor 610. In addition to transmitting a user equipment specific reference signal, the transceiving apparatus 620 is also configured to transmit at least one of a cell-specific reference signal and a cell channel estimation reference signal, and receive feedback information from the user equipment, the feedback information including channel state information estimated based on at least one of the cell-specific reference signal and the cell channel estimation reference signal. The cell-specific reference signal is CRS for example, and the cell channel estimation reference signal is CSI-RS for example. The channel state information fed back by the user equipment may include for example CQI, CDI, PMI and RI, etc.

The processor 610 includes a determining unit 603 and an adjusting unit 601. The determining unit 603 is configured to determine an initial setting of a communication resource scheduling, a multi-antenna precoding mode or a modulation coding scheme based on feedback information received by the transceiving apparatus 620. The adjusting unit 601 is configured to adjust the above initial setting determined by the determining unit 603 according to the channel state information determined by the user equipment based on the user equipment specific reference signal received by the transceiving apparatus 620.

Particularly, for adjustment of the communication resource scheduling schemes, the wireless communication device for base station side according to the embodiment may determine an adjustment manner of communication resource scheduling from a predetermined set of candidate communication resource schedulings. Specifically, in a case that the base station performs MU-MIMO scheduling, a current user scheduling scheme may be changed into another communication resource scheduling scheme selected from a set of candidate communication resource scheduling schemes if a channel quality indicated by the channel state indication from the user equipment is lower than a predetermined level. The set may include multiple candidate communication resource scheduling schemes ordered according to estimated communication rates, and the initial setting of the communication resource scheduling may be selected from the set based on the order. In addition, another communication resource scheduling scheme may be selected from the set by comparing a communication rate determined based on the equivalent channel state indication from the user equipment with communication rates estimated based on the candidate communication resource scheduling schemes.

For example, in performing MU-MIMO, the base station may calculate expected total communication rates according to different user combinations and rank the total communication rates. The base station may select a first user combination as an initial setting and determine an actual total rate according to the equivalent channel feedback from the user equipments. If the actual total rate is significantly lower than a total rate of a second user combination, user rescheduling is performed, for example, the second user combination is adopted. Other scheduling schemes include, for example, frequency scheduling and single user scheduling, etc.

For adjustment of a Modulation Coding Scheme (MCS), according to a specific embodiment, a modulation coding rate may be reduced if the channel quality determined based on the equivalent channel state indication from the user equipment is lower than a predetermined level; and the modulation coding rate may be increased if the determined channel quality is higher than a predetermined level.

For example, the modulation coding rate may be adjusted according to the CQI of the equivalent channel fed back by the user equipment, and n is predefined. If the CQI of the equivalent channel is lower or higher than an expected CQI by n grades, the base station adjusts the modulation coding rate accordingly.

In addition, the user equipment may feed back a channel quality of the equivalent channel based on a notification from the base station. According to an embodiment, the transceiving apparatus of the wireless communication device for base station side is configured to transmit a notification to the user equipment, the notification indicating whether the channel state indication determined based on the user equipment specific reference signal is to be transmitted by the user equipment. For example, the transceiving apparatus may transmit the notification to the user equipment via a RRC signaling, PDCCH or ePDCCH.

Figure 7:
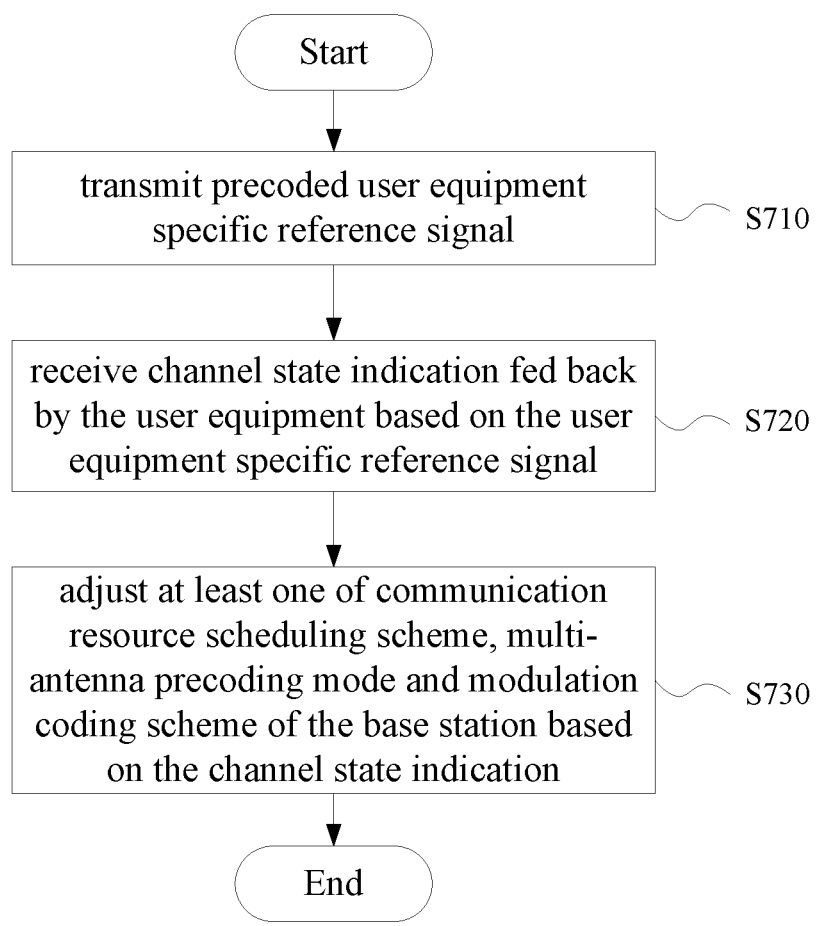
FIG. 7 is a flowchart of a process example of a wireless communication method performed by a base station according to an embodiment of the present disclosure.

Embodiments of the present disclosure further include a wireless communication method performed by a base station. As shown in FIG. 7, the method according to the embodiment includes: step S710, a precoded user equipment specific reference signal is transmitted; step S720, a channel state indication fed back by a user equipment based on the user equipment specific reference signal is received; and step S730, at least one of a communication resource scheduling scheme, a multi-antenna precoding mode and a modulation coding scheme of the base station is adjusted based on the channel state indication.

Figure 8:
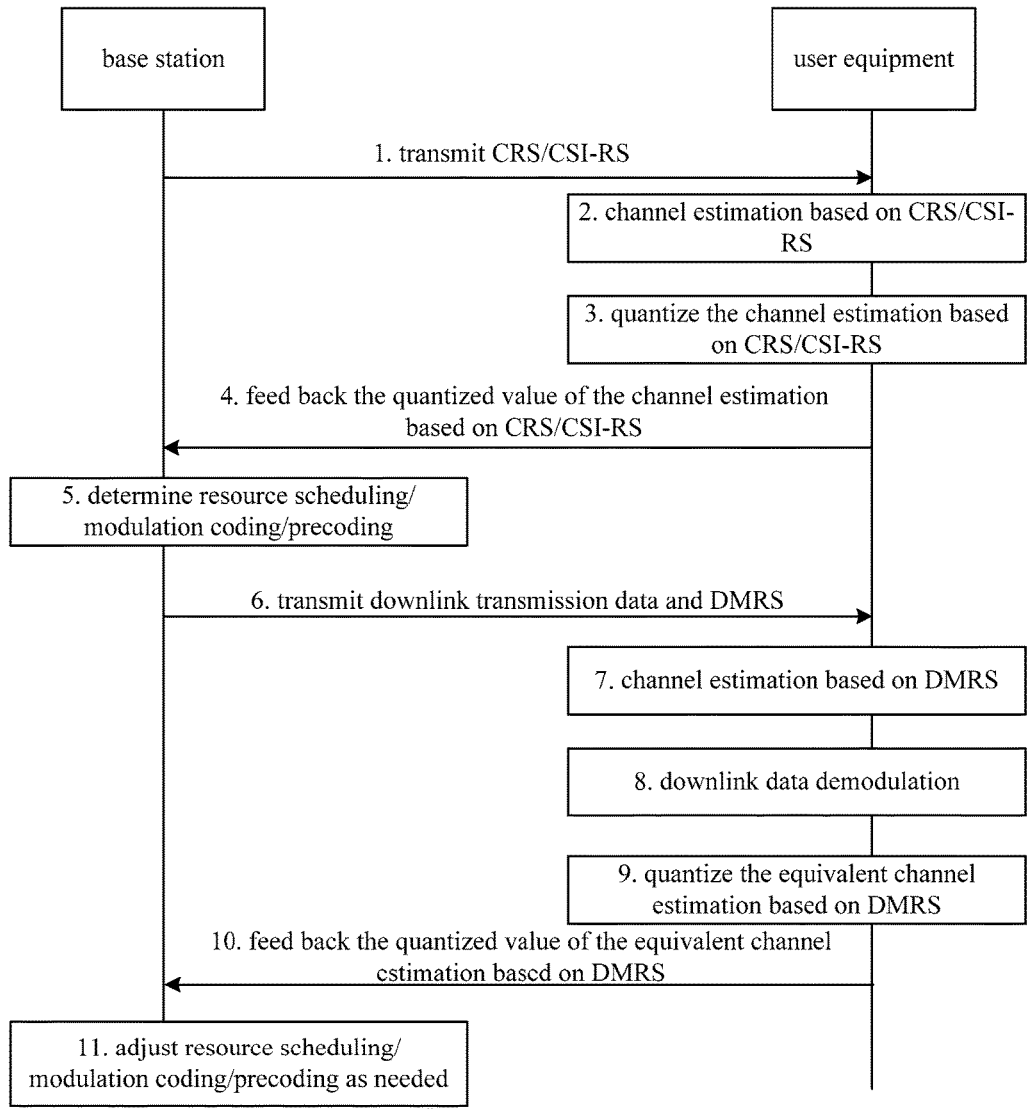
FIG. 8 is a schematic diagram of an information interaction process between devices corresponding to the wireless communication method according to an embodiment of the present disclosure.

Subsequently, an example of a communication process performed between a base station and a user equipment by the wireless communication method according to an exemplary embodiment of the present disclosure is described with reference to FIG. 8.

In a process 1, the base station transmits a cell-specific reference signal such as CRS/CSI-SR to the user equipment.

In a process 2, the user equipment performs channel estimation based on the cell-specific reference signal.

In a process 3, the user equipment quantizes the channel estimation to obtain a channel estimation quantized value.

In a process 4, the user equipment feeds back the channel estimation quantized value to the base station.

In a process 5, the base station determines initial settings of communication resource scheduling, a multi-antenna precoding mode and a modulation coding scheme, etc., based on the feedback.

In a process 6, the base station transmits a user equipment specific reference signal such as DMRS to the user equipment.

In a process 7, the user equipment performs equivalent channel estimation based on the user equipment specific reference signal.

In a process 8, the user equipment performs downlink data demodulation.

In a process 9, the user equipment quantizes the equivalent channel estimation to obtain an equivalent channel estimation quantized value.

In a process 10, the user equipment feeds back the equivalent channel estimation quantized value to the base station.

In a process 11, in a case that the base station determines that a predetermined condition is met based on the feedback, the base station adjusts the communication resource scheduling, the multi-antenna precoding mode and the modulation coding scheme, etc.

As an example, various steps of the methods above and various modules and/or units of the devices above may be implemented as software, firmware, hardware or a combination thereof. In a case of implementing by software or firmware, programs consisting of the software for implementing the methods above are installed to a computer with a dedicated hardware structure (for example a general-purpose computer 1000 shown in FIG. 9) from the storage medium or the network. The computer can perform various types of functions when installed with various types of programs.

Figure 9:
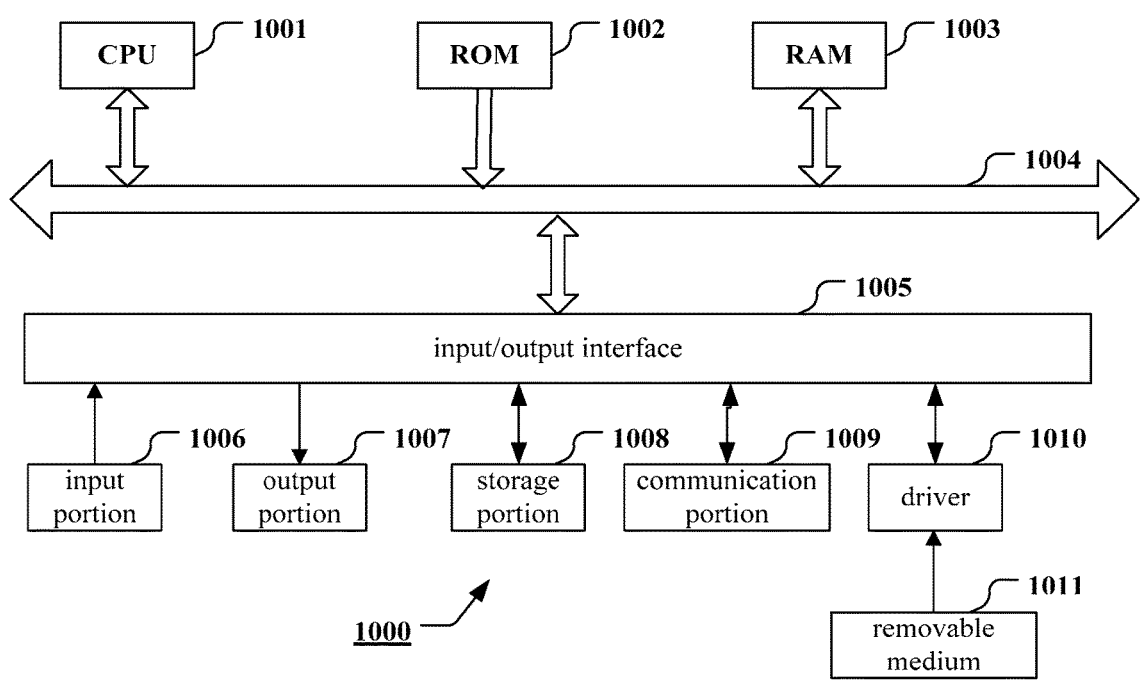
FIG. 9 is a block diagram of an exemplary structure of a computer for implementing the method and the device according to the present disclosure.

In FIG. 9, a central processing unit (CPU) 1001 performs various types of processing according to programs stored in a read only memory (ROM) 1002 or programs loaded from a storage portion 1008 to a random access memory (RAM) 1003. Data required when the CPU 1001 performs various types of processing is also stored in the RAM 1003 as needed. The CPU 1001, the ROM 1002 and the RAM 1003 are linked to each other via a bus 1004. An input/output interface 1005 is also linked to the bus 1004.

The following components are linked to the input/output interface 1005: an input portion 1006 (including a keyboard, and a mouse and so on), an output portion 1007 (including a display, for example a cathode ray tube (CRT) and a liquid crystal display (LCD), and a loudspeaker), a storage portion 1008 (including a hard disk and so on), and a communication portion 1009 (including a network interface card for example a LAN card, and a modem). The communication portion 1009 performs communication processing via a network for example the Internet. A driver 1010 may also be linked to the input/output interface 1005 as needed. A removable medium 1011 for example a magnetic disk, an optical disk, a magnetic-optical disk and a semiconductor memory may be installed on the driver 1010 as needed, such that computer programs read from the removable medium 1011 are installed on the storage portion 1008 as needed.

In a case of performing the series of processing described above by software, programs consisting of the software are installed from the network for example the Internet or the storage medium for example the removable medium 1011.

Those skilled in the art should understand that the storage medium is not limited to the removable medium 1011 shown in FIG. 9 which stores programs and is distributed separately from the device to provide the programs to the user. Examples of the removable medium 1011 include: a magnetic disk (including a floppy disk (registered trademark), an optical disk (including a compact disk read only memory (CD-ROM) and a digital versatile disk (DVD), a magnetic-optical disk (including a mini disk (MD) (registered trademark)), and a semiconductor memory. Alternatively, the storage medium may be a hard disk included in the ROM 1002 and the storage portion 1008 which stores programs. The storage medium and the device including thereof together are distributed to the user.

A program product storing machine readable instruction codes is further provided according to the embodiments of the present disclosure. When read and executed by a machine, the instruction codes cause the machine to perform the method according to the embodiment of the present disclosure.

Accordingly, a storage medium for carrying the program product storing the machine readable instruction codes is also included in the present disclosure. The storage medium includes but not limited to a floppy disk, an optical disk, a magnetic-optical disk, a storage card and a memory stick and so on.

The embodiments of the present disclosure further relate to an electronic device in the following. In a case that the electronic device is for base station side, the electronic device may be implemented as any type of evolved node B (eNB), such as a macro eNB and a small eNB. The small eNB may be an eNB covering a cell smaller than a macro cell, such as a pico eNB, a micro eNB and a home (femto) eNB. Alternatively, the electronic device may be implemented as any other type of base stations, such as a NodeB and a base transceiver station (BTS). The electronic device may include: a body configured to control wireless communication (also referred to as a base station device); and one or more remote radio heads (RRH) located at positions different from the body. In addition, various types of terminals described in the following each may function as a base station to operate by performing functions of the base station temporarily or in a semi-permanent manner.

In a case that the electronic device is for user equipment side, the electronic device may be implemented as mobile terminals (such as a smart phone, a tablet personal computer (PC), a notebook PC, a portable game terminal, a portable/dongle mobile router and a digital camera) or a vehicle terminal (such as an automobile navigation device). In addition, the electronic device may be a wireless communication module installed on each of the above terminals (such as an integrated circuit module including one or more chips).

Application Example on Terminal Device

First Application Example

Figure 10:
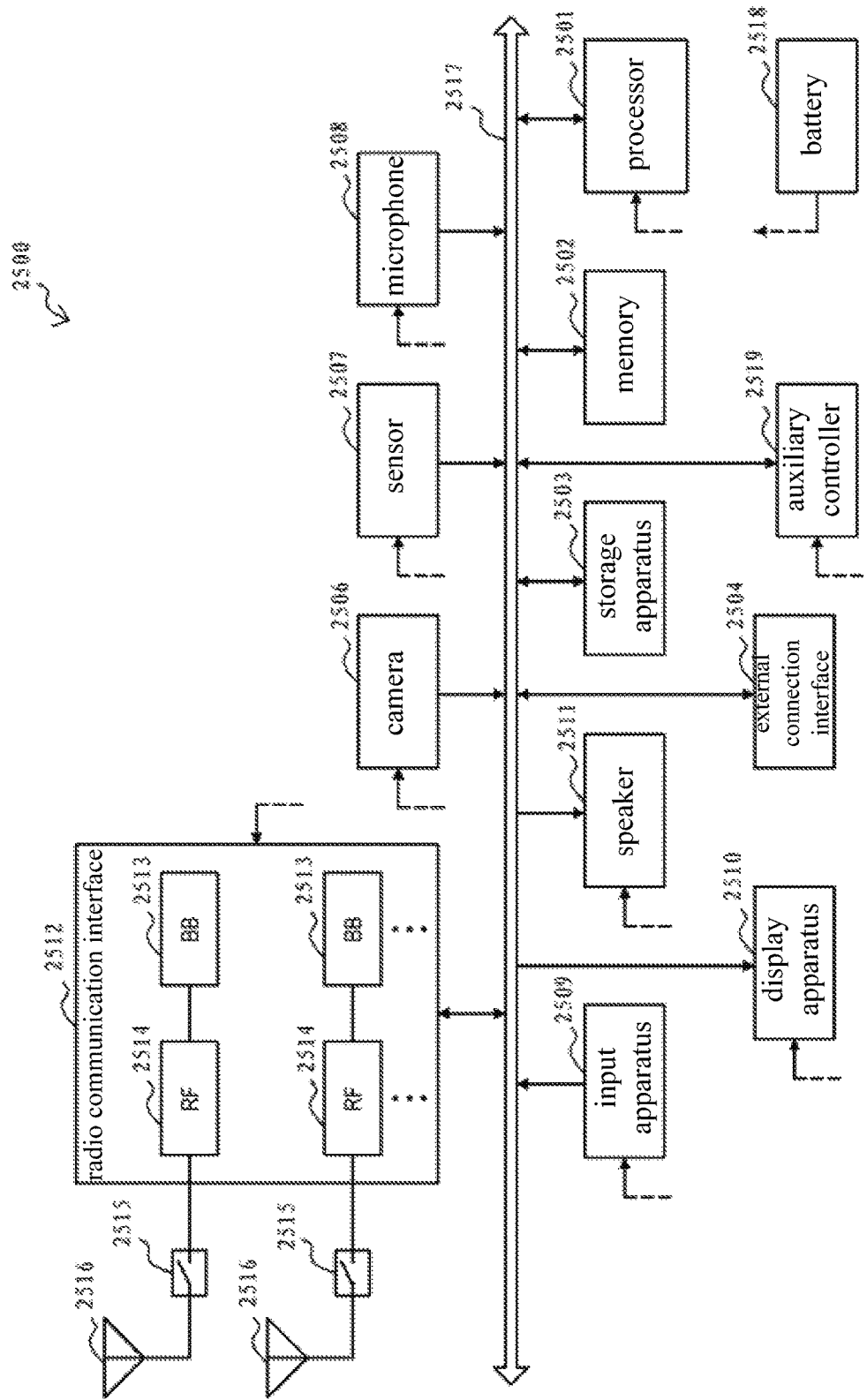
FIG. 10 is a block diagram of an example a schematic configuration of a smart phone to which technology of the present disclosure may be applied.

FIG. 10 is a block diagram illustrating an example of a schematic configuration of a smart phone 2500 to which the technology of the present disclosure may be applied. The smart phone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smart phone 2500. The memory 2502 includes RAM and ROM, and stores a program that is executed by the processor 2501, and data. The storage 2503 may include a storage medium such as a semiconductor memory and a hard disk. The external connection interface 2504 is an interface for connecting an external apparatus such as a memory card and a universal serial bus (USB) apparatus to the smart phone 2500.

The camera 2506 includes an image sensor such as a charge coupled device (CCD) and a complementary metal oxide semiconductor (CMOS), and generates a captured image. The sensor 2507 may include a group of sensors such as a measurement sensor, a gyro sensor, a geomagnetic sensor, and an acceleration sensor. The microphone 2508 converts sounds that are input to the smart phone 2500 to audio signals. The input device 2509 includes, for example, a touch sensor configured to detect touch onto a screen of the display apparatus 2510, a keypad, a keyboard, a button, or a switch, and receive an operation or information input from a user. The display apparatus 2510 includes a screen such as a liquid crystal display (LCD) and an organic light-emitting diode (OLED) display, and displays an output image of the smart phone 2500. The speaker 2511 converts audio signals that are output from the smart phone 2500 to sounds.

The radio communication interface 2512 supports any cellular communication scheme such as LTE and LTE-Advanced, and performs radio communication. The radio communication interface 2512 may typically include, for example, a BB processor 2513 and an RF circuit 2514. The BB processor 2513 may perform, for example, encoding/decoding, modulating/demodulating, and multiplexing/demultiplexing, and performs various types of signal processing for radio communication. Meanwhile, the RF circuit 2514 may include, for example, a mixer, a filter, and an amplifier, and transmits and receives radio signals via the antenna 2516. The radio communication interface 2512 may be a chip module having the BB processor 2513 and the RF circuit 2514 integrated thereon. The radio communication interface 2512 may include multiple BB processors 2513 and multiple RF circuits 2514, as illustrated in FIG. 10. Although FIG. 10 illustrates the example in which the radio communication interface 2512 includes the multiple BB processors 2513 and the multiple RF circuits 2514, the radio communication interface 2512 may also include a single BB processor 2513 or a single RF circuit 2514.

Furthermore, in addition to a cellular communication scheme, the radio communication interface 2512 may support another type of radio communication scheme such as a short-distance radio communication scheme, a near field communication scheme, and a radio local area network (LAN) scheme. In this case, the radio communication interface 2512 may include the BB processor 2513 and the RF circuit 2514 for each radio communication scheme.

Each of the antenna switches 2515 switches connection destinations of the antennas 2516 among multiple circuits (such as circuits for different radio communication schemes) included in the radio communication interface 2512.

Each of the antennas 2516 includes a single or multiple antenna elements (such as multiple antenna elements included in a MIMO antenna), and is used for the radio communication interface 2512 to transmit and receive radio signals. The smart phone 2500 may include the multiple antennas 2516, as illustrated in FIG. 10. Although FIG. 12 illustrates the example in which the smart phone 2500 includes the multiple antennas 2516, the smart phone 2500 may also include a single antenna 2516.

Furthermore, the smart phone 2500 may include the antenna 2516 for each radio communication scheme. In this case, the antenna switches 2515 may be omitted from the configuration of the smart phone 2500.

The bus 2517 connects the processor 2501, the memory 2502, the storage 2503, the external connection interface 2504, the camera 2506, the sensor 2507, the microphone 2508, the input device 2509, the display device 2510, the speaker 2511, the radio communication interface 2512, and the auxiliary controller 2519 to each other. The battery 2518 supplies power to blocks of the smart phone 2500 illustrated in FIG. 12 via feeder lines, which are partially shown as dashed lines in the figure. The auxiliary controller 2519 operates a minimum necessary function of the smart phone 2500, for example, in a sleep mode.

Second Application Example

Figure 11:
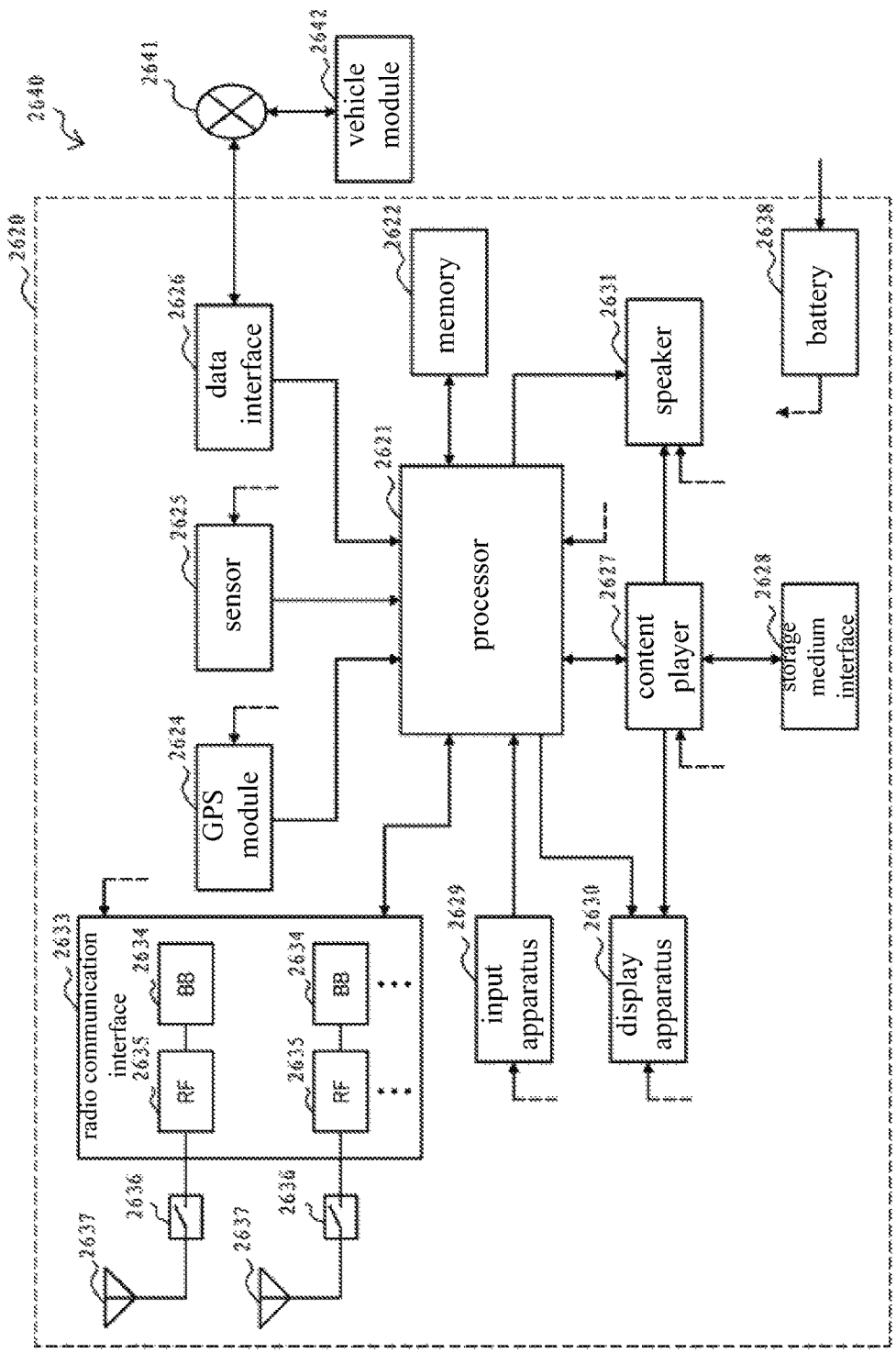
FIG. 11 is a block diagram of an example of a schematic configuration of an automobile navigation device to which technology of the present disclosure may be applied.

FIG. 11 is a block diagram of an example of a schematic configuration of an automobile navigation device 2620 to which the technology of the present disclosure may be applied. The automobile navigation device 2620 includes: a processor 2621, a memory 2622, a global positioning system (GPS) module 2624, a sensor 2625, a data interface 2626, a content player 2627, a storage medium interface 2628, an input apparatus 2629, a display apparatus 2630, a speaker 2631, a radio communication interface 2633, one ore more antenna switches 2636, one or more antennas 2637 and a battery 2638.

The processor 2621 may be for example a CPU or a SoC, and controls a navigation function and another functions of the automobile navigation device 2620. The memory 2622 includes RAM and ROM, and stores program executed by the processor 2621 and data.

The GPS module 2624 measures a position of the automobile navigation device 2620 (such as a latitude, a longitude and a height) using a GPS signal received from a GPS satellite. The sensor 2625 may include a group of sensors, such as a gyro sensor, a geomagnetic sensor and an air pressure sensor. The data interface 2626 is connected to a vehicle network 2641 for example via a terminal not shown, and acquires data generated by the vehicle (such as vehicle speed data).

The content player 2627 reproduces content stored in a storage medium (such as CD and DVD), and the storage medium is inserted into the storage medium interface 2628. The input apparatus 2629 includes a touch sensor, a button or a switch configured to detect touch onto a screen of the display apparatus 2630, and receive an operation or information input by a user. The display apparatus 2630 includes a screen of an LCD or an OLED display for example, and displays an image with a navigation function or reproduced content. The speaker 2631 outputs sounds with a navigation function or reproduced content.

The radio communication interface 2633 supports any cellular communication scheme (such as LTE and LTE-advanced) and performs radio communication. The radio communication interface 2633 may generally include for example a BB processor 2634 and an RF circuit 2635. The BB processor 2634 may perform for example encoding/decoding, modulating/demodulating and multiplexing/demultiplexing, and performs various types of signal processing for radio communication. In addition, the RF circuit 2635 may include for example a mixer, a filter and an amplifier, and transmits and receives a radio signal via the antenna 2637. The radio communication interface 2633 may be a chip module having a BB processor 2634 and an RF circuit 2635 integrated thereon. As shown in FIG. 11, the radio communication interface 2633 may include multiple BB processors 2634 and multiple RF circuits 2635. Although FIG. 11 shows the example in which the radio communication interface 2633 includes multiple BB processors 2634 and multiple RF circuits 2635, the radio communication interface 2633 may also include a single BB processor 2634 and a single RF circuit 2635.

Further, in addition to the cellular communication scheme, the radio communication interface 2633 may support another types of radio communication schemes, such as a short distance radio communication scheme, a near field communication scheme and a wireless LAN scheme. In this case, for each radio communication scheme, the radio communication interface 2633 may include the BB processor 2634 and the RF circuit 2635.

Each of the antenna switches 2636 switches connection destinations of the antennas 2637 among multiple circuits (such as circuits for different radio communication schemes) included in the radio communication interface 2633.

Each of the antennas 2637 includes a single or multiple antenna elements (such as multiple antenna elements included in an MIMO antenna) and is used for the radio communication interface 2633 to transmit and receive a radio signal. As shown in FIG. 11, the automobile navigation device 2620 may include multiple antennas 2637. Although FIG. 13 shows the example in which the automobile navigation device 2620 includes multiple antennas 2637, the automobile navigation device 2620 may include a single antenna 2637.

In addition, the automobile navigation device 2620 may include an antenna 2637 for each radio communication scheme. In this case, the antenna switch 2636 may be omitted from the configuration of the automobile navigation device 2620.

The battery 2638 supplies power for blocks of the automobile navigation device 2620 shown in FIG. 11 via feeder lines, which are shown partially as dotted lines in the figure. The battery 2638 accumulates the power provided by the vehicle.

The technology of the present disclosure may be implemented as a vehicle system (or a vehicle) 2640 including one or more of the automobile navigation device 2620, the vehicle network 2641 and the vehicle module 2642. The vehicle module 2642 generates vehicle data (such as a vehicle speed, an engine speed and fault information), and outputs the generated data to the vehicle network 2641.

In the description of specific embodiments of the present disclosure above, features described and/or illustrated for one embodiment may be used in one or more other embodiments in the same or similar manner, combined with features in other embodiments, or substitute for features in other embodiments.

It should be noted that, terms "including/comprising" used herein refer to existing of features, elements, steps or components, but existing or adding of one or more other features, elements, steps or components is not excluded.

In the above embodiments and examples, reference numerals consisting of numbers are used to indicate various steps and/or units. Those skilled in the art should understand that the reference numerals are used to facilitate describing and drawing, and are not intended to indicate an order or limit in any way.

In addition, the method according to the present disclosure is not limited to be performed in a time order described in the description, and may be performed according to other time orders, in parallel or independently. Therefore, the order in which the method described in the description is performed does not limit the technical scope of the present disclosure.

Although the present disclosure is disclosed by the description of specific embodiments of the present disclosure above, it should be understood that all the embodiments and examples described above are only schematic and are not intended to limit. For those skilled in the art, various changes, improvements or equivalents may be designed for the present disclosure within the spirit and scope of the appended claims. The changes, improvements or equivalents should be regarded as falling within the protection scope of the present disclosure.

The invention claimed is:

1. A wireless communication device for a user equipment side, comprising:
at least one processor configured to:
estimate, based on a precoded reference signal from a base station serving the user equipment, an equivalent channel from the base station to the user equipment; and
generate a channel state indication of the estimated equivalent channel to be fed back to the base station,
wherein the channel state indication comprises a channel quality indication obtained conditioned on the estimated equivalent channel, and
wherein the at least one processor is further configured to:
estimate a channel from the base station to the user equipment based on a non-precoded reference signal from the base station, and
generate the channel state indication to be fed back to the base station by using the equivalent channel estimated based on the precoded reference signal in combination with the channel estimated based on the non-precoded reference signal.

2. The wireless communication device according to claim 1, wherein the at least one processor is further configured to detect the precoded reference signal on a specific transmission resource configured to the user equipment.

3. The wireless communication device according to claim 2, wherein the channel state indication corresponds to a subband channel state information.

4. The wireless communication device according to claim 1, wherein the precoded reference signal has been precoded by the base station with a precoding matrix, and the equivalent channel corresponds to a physical channel from the base station to the user equipment applied with the precoding matrix.

5. The wireless communication device according to claim 1, wherein the channel state indication further comprises one or more of a channel direction index, a precoding matrix index, and a rank index obtained conditioned on the equivalent channel.

6. The wireless communication device according to claim 1, wherein the precoded reference signal is a user equipment specific reference signal specific to the user equipment.

7. The wireless communication device according to claim 1, wherein the wireless communication device is the user equipment, and the wireless communication device further comprises a transceiving apparatus configured to transmit the channel state indication to the base station.

8. The wireless communication device according to claim 7, wherein the transceiving apparatus is further configured to receive a notification from the base station, the notification indicating whether the channel state indication is to be transmitted by the user equipment.

9. The wireless communication device according to claim 7, wherein the transceiving apparatus is further configured to transmit the channel state indication via a physical uplink control channel or a physical uplink shared channel.

10. A wireless communication method performed by a user equipment, comprising:
    estimating, based on a precoded reference signal from a base station serving the user equipment, an equivalent channel from the base station to the user equipment;
    generating a channel state indication of the estimated equivalent channel to be fed back to the base station, wherein the channel state indication comprises a channel quality indication calculated conditioned on the estimated equivalent channel;
    estimating a channel from the base station to the user equipment based on a non-precoded reference signal from the base station; and
    generating the channel state indication to be fed back to the base station by using the equivalent channel estimated based on the precoded reference signal in combination with the channel estimated based on the non-precoded reference signal.

11. A wireless communication device for a base station side, comprising:
    a transceiving apparatus configured to transmit a precoded reference signal to a user equipment served by the base station, and receive a channel state indication of an estimated equivalent channel fed back by the user equipment based on the precoded reference signal; and
    at least one processor configured to determine at least one of a communication resource scheduling scheme, a multi-antenna precoding mode and a modulation coding scheme of the base station based on the channel state indication,
    wherein the channel state indication comprises a channel quality indication obtained conditioned on the estimated equivalent channel,
    wherein a channel from the base station to the user equipment is estimated based on a non-precoded reference signal from the base station, and
    wherein the channel state indication to be fed back to the base station is generated by using the equivalent channel estimated based on the precoded reference signal in combination with the channel estimated based on the non-precoded reference signal.

12. The wireless communication device according to claim 11, wherein the channel state indication further comprises one or more of a channel direction index, a precoding matrix index, and a rank index obtained conditioned on the equivalent channel.

13. The wireless communication device according to claim 11, wherein the precoded reference signal has been precoded by the base station with a precoding matrix, and the equivalent channel corresponds to a physical channel from the base station to the user equipment applied with the precoding matrix.

14. The wireless communication device according to claim 13, wherein the channel state indication further comprises one or more of an equivalent channel direction index, a precoding matrix index, and a rank index.

15. The wireless communication device according to claim 11, wherein the transceiving apparatus is further configured to transmit the non-precoded reference signal, and receive feedback information from the user equipment, the feedback information comprising channel state information estimated based on the non-precoded reference signal; and
    the at least one processor is further configured to determine an initial setting of the communication resource scheduling, the multi-antenna precoding mode or the modulation coding scheme based on the feedback information.

16. The wireless communication device according to claim 11, wherein the at least one processor is further configured to: in a case that the base station performs multi-user multi-input multi-output scheduling, change a current user scheduling scheme to another communication resource scheduling scheme selected from a set of candidate communication resource scheduling schemes if a channel quality indicated by the channel state indication is lower than a predetermined level.

17. A wireless communication method performed by a base station, comprising:
    transmitting a precoded reference signal to a user equipment served by the base station, and receive a channel state indication of an estimated equivalent channel fed back by the user equipment based on the precoded reference signal; and
    determining at least one of a communication resource scheduling scheme, a multi-antenna precoding mode and a modulation coding scheme of the base station based on the channel state indication,
    wherein the channel state indication comprises a channel quality indication obtained conditioned on the estimated equivalent channel,
    wherein a channel from the base station to the user equipment is estimated based on a non-precoded reference signal from the base station, and
    wherein the channel state indication to be fed back to the base station is generated by using the equivalent channel estimated based on the precoded reference signal in combination with the channel estimated based on the non-precoded reference signal.

* * * * *